Sept. 24, 1940.    W. P. WILLS    2,215,805
MEASURING AND CONTROL APPARATUS
Filed March 31, 1937    3 Sheets-Sheet 1
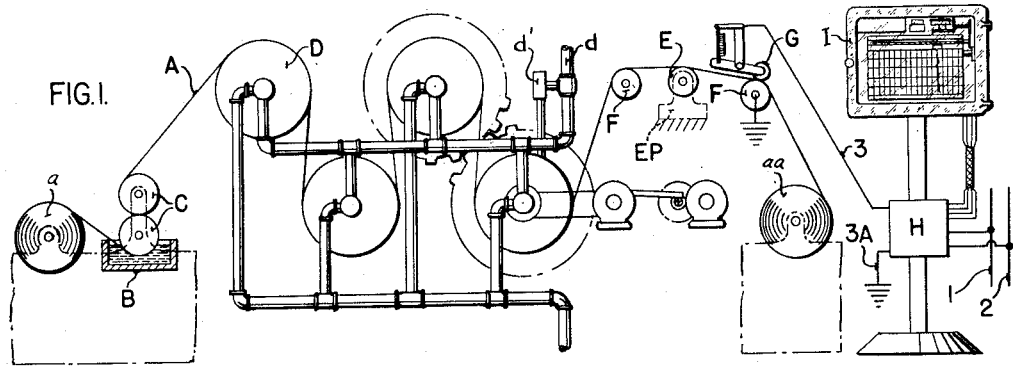
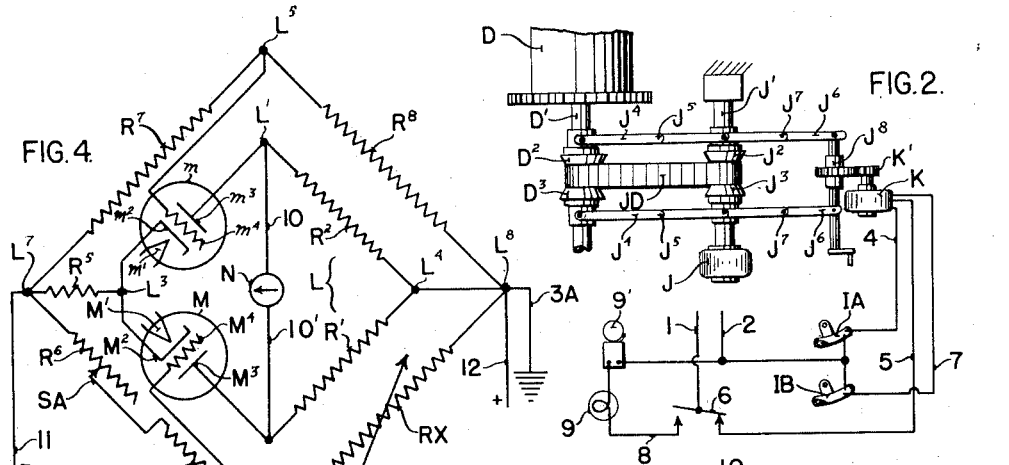
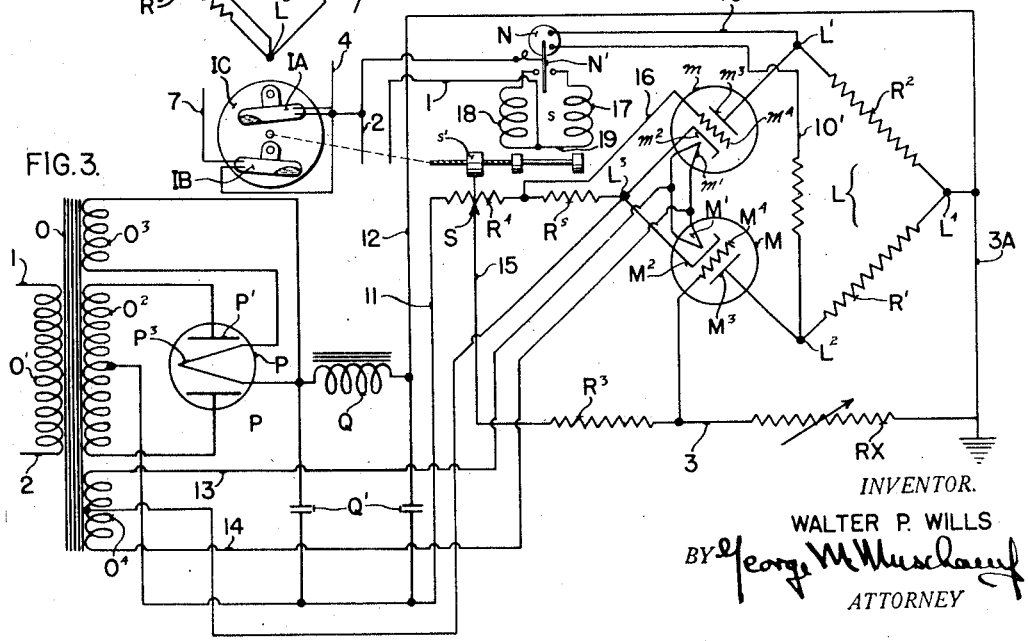
INVENTOR.
WALTER P. WILLS
BY George M. Muschamp
ATTORNEY Sept. 24, 1940.                W. P. WILLS                2,215,805
                      MEASURING AND CONTROL APPARATUS
                       Filed March 31, 1937        3 Sheets-Sheet 2
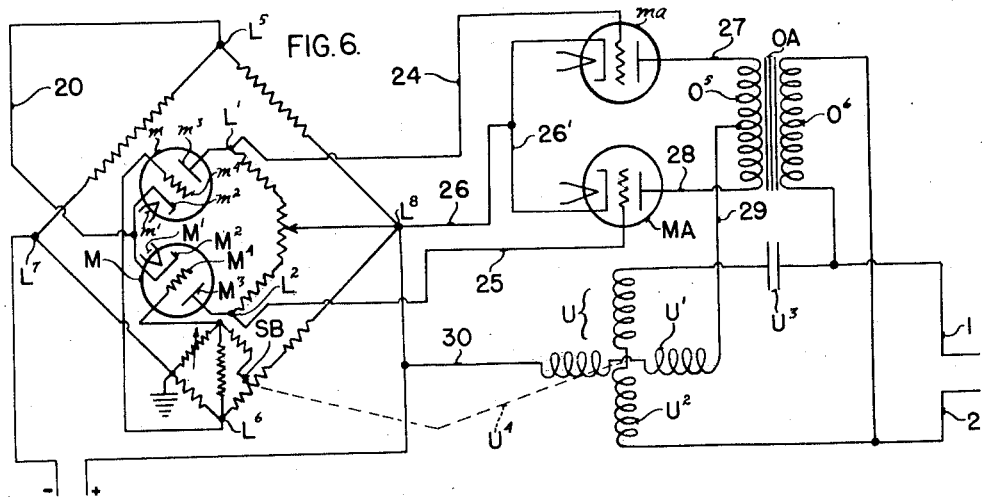
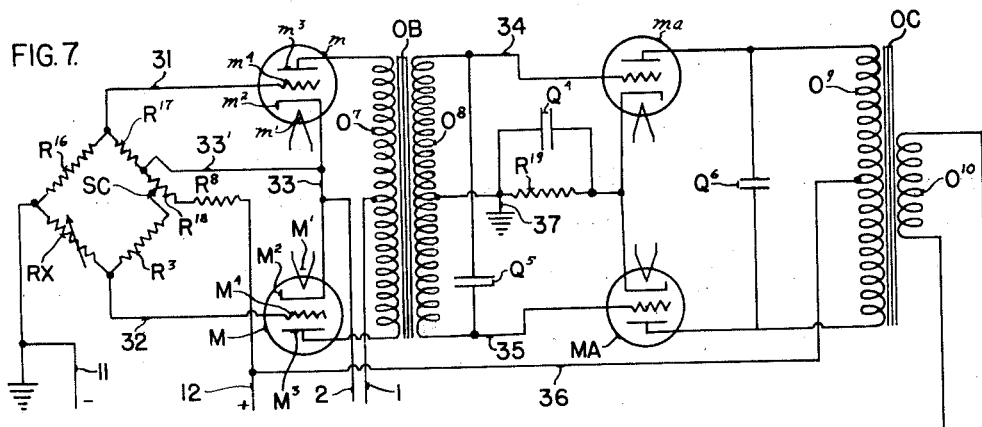
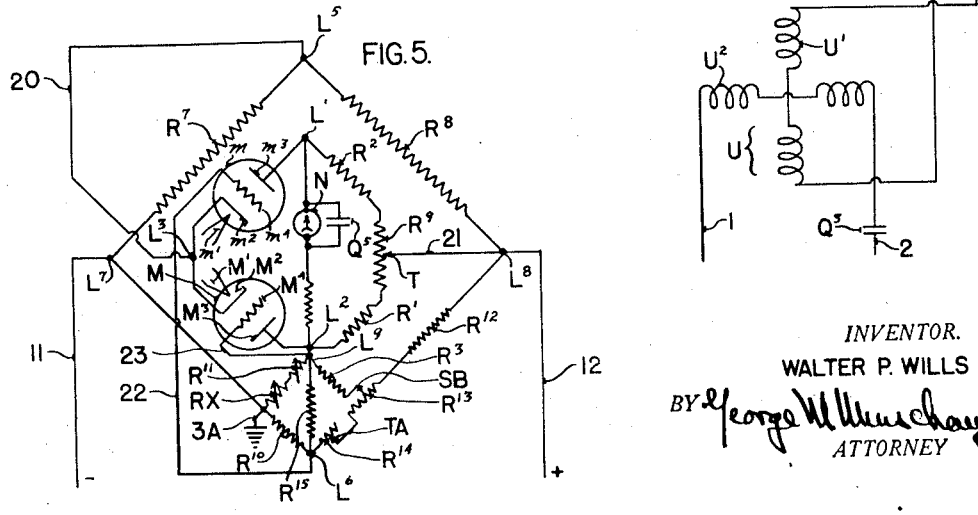
INVENTOR.
WALTER P. WILLS
BY George W. ...
ATTORNEY

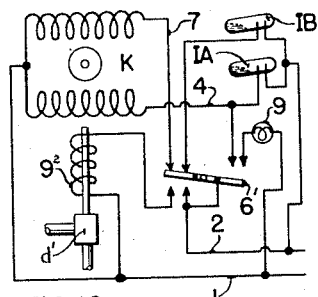
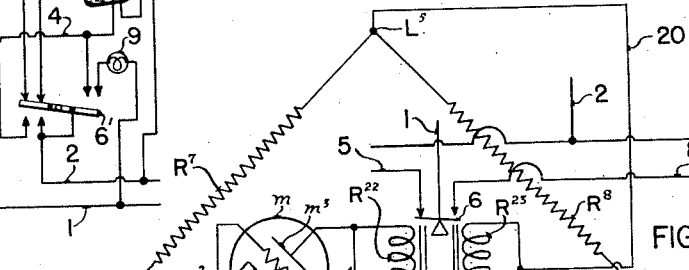
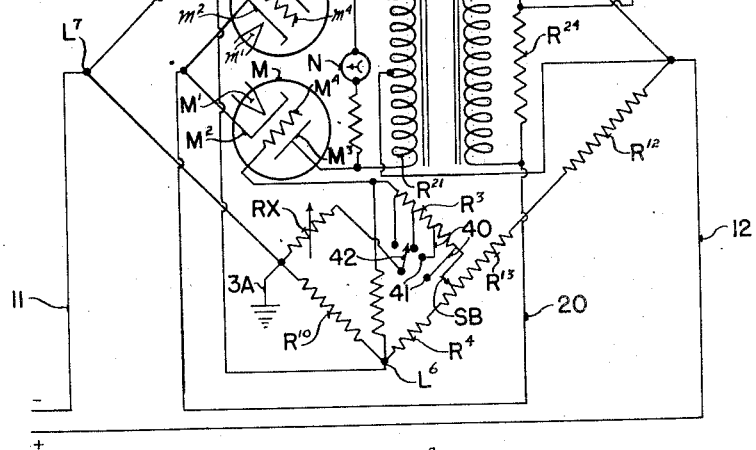
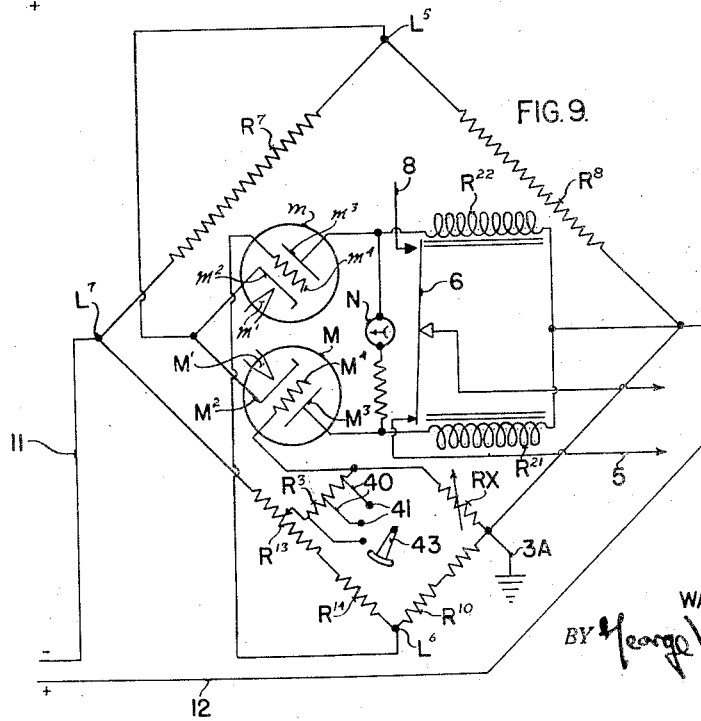

Patented Sept. 24, 1940

2,215,805

UNITED STATES PATENT OFFICE 2,215,805

MEASURING AND CONTROL APPARATUS

Walter P. Wills, Philadelphia, Pa., assignor to The Brown Instrument Company, Philadelphia, Pa., a corporation of Pennsylvania Application March 31, 1937, Serial No. 134,092

24 Claims. (Cl. 175—183)

The present invention comprises improvements in methods of and apparatus for making electrical measurements, and, particularly, measurements of the electric conductivity of materials. More specifically, the object of the invention is to provide simple and efficient methods and apparatus particularly adapted for use in measuring the electrical conductivity of materials or bodies of high resistance.

A special object of the invention is to provide an improved method of and apparatus for measuring the moisture content of solid bodies such as textile, paper, and other sheets or webs, and the invention comprises features especially devised and adapted for use in measuring the moisture content of a moving web of material, by measuring the electrical conductivity of the web. Such measurements are particularly important in the paper making and textile arts, and by way of example, I have illustrated, and hereinafter described in detail, the use of various forms of embodiment of the present invention in measuring the moisture content of a travelling web of warp yarn at the end of a sizing operation to which the yarn is subjected preparatory to its use in a weaving loom. In the manufacture of woven fabrics by high speed weaving methods, its has been found necessary to increase the strength of the warp, or to increase its resistance to the friction or chafing to which it is subjected in the weaving operation, by subjecting the yarn to a sizing or so-called "slashing" treatment.

That treatment consists in the application to the yarn of a solution composed of suitable ingredients forming a protective coating on the yarn and its fibrous constituents, and softening the threads to make them sufficiently pliable to bend about the filling threads in the woven goods.

In the slashing operation, it has been found that the best results are obtained when the sizing is applied to the warp after the latter has been wound on a warp beam, and while it is being unwound from the warp beam and wound up on a loom beam, as the final step in the preparation of the warp for insertion in the loom. In thus slashing or sizing warp yarn, it is desirable that the sized warp yarn, when wound on the loom beam should be at a suitably low temperature, and should have a moisture content, within a small range of permissible variation, and much smaller than the moisture content of the yarn as it passes away from the sizing bath. To reduce the moisture content of the yarn as it passes away from the sizing bath, the yarn is moved over steam heated drying drums or rolls, and is then cooled by passing it over a cooling roll. The proper operation of the slashing machine is greatly facilitated by an accurate measurement of the moisture content in the web as it passes from the slasher proper, to the loom beam on which it is wound, not only because the moisture content must be closely controlled, but also because in the operation of a properly designed slasher, the maintenance of a suitable moisture content, insures against risk of overheating the drying rolls and resultant burning or injuring of the warp yarn. That the range of variation in the moisture content of the warp should be narrow is practically essential, because a certain small moisture content in the yarn is desirable to permit evaporative cooling of the yarn and resultant dissipation of frequency heat in the weaving operation, while a moisture content, but little greater than that required for the desired evaporative cooling action may result in the mildewing or discoloration of the fabric produced, and is otherwise objectionable in the weaving operation.

In determining the moisture content of the sized yarn by measuring the electric conductivity of the yarn, I avoid difficulties inherent in methods heretofore employed or proposed. For example, one prior method of measuring the moisture content consists in passing over the moving web a dry gas which absorbs moisture from the web, and then measuring the moisture content of the gas by means of an ordinary wet and dry bulb hygrometer. Another method employs a radio frequency oscillating circuit including a variable condenser having a perforated plate in proximity to the web and a dielectric of hygroscopic material, whereby the capacity of the condenser is changed by the moisture absorbed by the hygroscopic material, and thereby produces measurable changes in the frequency of the current flow in the oscillating circuit. Each of these methods is open to the objection that they indicate the moisture content of one side of the web only, rather than of the entire web, and that the accuracy of the measurements is affected by the atmospheric humidity modifying effect of the moisture evaporating from the web, and by the fact that the measurements are effected with an objectionable time lag. The method which makes use of the oscillating circuit is also subject to inaccuracy because of frequency instability resulting from variation in the plate voltage impressed on the oscillating tube of the circuit.

All of the foregoing objections are avoided by the use of my invention, wherein the measurement of the electrical conductivity of the warp yarn is effected without time lag, and is not affected by changes in the relative humidity of the atmosphere enveloping the web, and the electric circuits which I have devised for use in the practice of my invention automatically compensate for fluctuations in the circuit energizing voltage, so that my improved apparatus may be energized by any available commercial source of electric current. I have found furthermore, that despite popular opinion to the contrary, that the conductivity method employed by me is substantially free from extraneous effects resulting from mineral salts and the like in the material being measured.

Heretofore various devices have been proposed for measuring the moisture content of webs and other substances in terms of electrical conductivity, which have proved more or less unsatisfactory for various reasons including the excessive sensitivity of such prior devices. In these prior art devices it is common to apply a direct current source of electricity to opposite sides of the web and to measure the current flow by means of a galvanometer or other sensitive electric current measuring instrument, but the theory of operation of such devices demands that the voltage applied to the web be substantially constant and that it be of such magnitude as to cause a flow of electric current through the web which is capable of measurement by means of the current measuring instruments employed. When the moisture content of a web is so measured, the range capable of measurement is exceedingly small because the electrical resistance of the web varies from a high value of, for example, 1000 megohms to a comparatively low value of, for example, 1 megohm with a change in moisture content of only a few per cent. The reason for this rapid resistance drop in the web, with increase in moisture content resides in the relationship between the web moisture content and the web breakdown voltage which is such that with the voltage applied to the web maintained constant, the breakdown point is quickly reached. This breakdown point may be varied with respect to web moisture content by varying the voltage applied to the web, that is, when the moisture content increases the breakdown may be delayed by reducing the voltage applied to the web and greater ranges of moisture content are possible of measurement. This feature of my invention whereby the sensitivity of the final measuring element to moisture changes is reduced, or in other words a greater deflection is obtained for a given moisture change, is applicable to other uses as will be apparent to those skilled in the art.

To facilitate an understanding of the invention in respect to the effect upon the range or sensitivity of the measurement of the electrical and electrochemical actions in the measuring apparatus and in the material being tested, as well as the failure of extraneous materials to effect the measurement, the theory of the measurement operation is hereafter explained.

An analysis of colloidal or gel fibers, of which textile and paper webs, for example, are principally composed, offers an explanation of why the salts contained in the webs has no noticeable effect on the electrical resistance thereof as long as the breakdown potential of the fibers is not reached. Textile fibers consist of a mass of filaments each of which may be regarded as a more or less porous gel structure. It is typical of gels to expand with increasing moisture and to shrink to a horny mass on drying. The absorption process is reversible with a swelling and a shrinking of the fiber according to its moisture content. When moisture is being taken on, the fiber swells progressively across its diameter many times its expansion in length. Analysis of the internal structure of fibers by means of X-rays has shown them to be of submicroscopic crystallites or micells, into or between which water enters. The molecules are regarded as opening up, spring fashion, as more or less water is being taken on.

Recent studies of colloids indicate that insulation made of cellulose and the like, which normally has a low electrical conductivity carries current by electronic conduction, that is there is no transfer of matter as in ionic conduction as, for example, occurs in the electrolytic conduction through liquids. In order for the colloids to conduct appreciable electric current, conditions permitting ionic conduction must be set up. The gel must permit a more or less migration of ions and ionized particles for electric current to flow. The mobility of ions and particles in a gel, like a fluid through capillaries, depends upon the diameter of the passages. Or, it may be looked upon as a variation such as friction of a flow through a more or less viscous body. Accordingly as the fibers shrink and harden and a restriction of the pores takes place, the ion mobility is reduced. Conversely as the fibers swell, the mobility of the ions is increased.

For any flow of current by ionic conduction, ions, meaning generally any mineral or ash forming matter, must, of course, be present. Such matter is normally present because of traces of mineral impurities. The magnitude of current flow, however, does not depend to any great extent upon how many ions are present, but only on how those present are able to travel through the fibers. In measuring the moisture content of a web in terms of electrical conductivity, therefore, regardless of whether the fabric has been dyed or sized or contains moisture having hard or soft properties, and thereby contains many or few ions, the number of ions conducted will depend on the moisture content and thereby only the moisture content will be registered. Thus, for example, there is a range in which the electric current flow, if any, is a result of pure electronic conduction, another range in which the conduction is partly electronic and partly ionic, and a further range in which the conduction is in effect solely ionic. The latter range corresponds to the region in which the web breakdown potential is reached and it is, therefore, desirable to limit to a minimum the current flow through the web which results because of such predominant ionic conduction.

The various features of novel which characterize my invention are set forth in the appended claims. For a better understanding of the invention, however, and of its advantages and specific objects attained with its use, reference should be had to the accompanying drawings and descriptive matter in which I have illustrated and described preferred embodiments of my invention.

Of the drawings:

Fig. 1 is a diagrammatic representation of a warp sizing or "slasher" machine, and means associated therewith in accordance with the present invention for measuring the moisture content of the yarn after it has passed over the drying and cooling rolls of the slasher;

Fig. 2 is a view, partly plan and partly diagrammatic, illustrating means for automatically varying the speed of the slasher drying drums to thereby vary their web drying action;

Fig. 3 is a diagram illustrating a preferred electric measuring circuit arrangement used in the embodiment of the invention shown in Fig. 1;

Fig. 4 is a diagram illustrating a modification in the circuit arrangement of Fig. 3, including a self-balancing Wheatstone bridge, with the resistance under measurement included in one arm of a deflectional type Wheatstone bridge;

Fig. 5 illustrates a modification of the circuit arrangement of Fig. 3, constituting a preferred form of my invention for use in measuring the moisture content of a moving web;

Fig. 6 is a diagram illustrating a modification of the circuit arrangement of Fig. 5, including a special reversible alternating current motor arrangement for rebalancing the bridge;

Fig. 7 is a diagram illustrating another modification including a special reversible alternating current motor arrangement for rebalancing the bridge;

Fig. 8 is a diagram illustrating a modification of the circuit arrangement of Fig. 5 including special provisions giving protection against the effects of voltage failure, and tube burnouts and other possible circuit failures;

Fig. 9 is a diagram illustrating a modification of the arrangement shown in Fig. 8, including similar protective features; and Fig. 10 is a diagram illustrating a modification of the circuit arrangement of Fig. 8 including additional protective features.

In Fig. 1, I have illustrated the use of my invention in measuring the electric conductivity of a web of sized warp yarn, as it leaves a sizing machine or "slasher" of conventional type. In the slasher shown in Fig. 1, the warp A is unwound from a warp beam $a$, and is passed from the latter through a sizing bath in a sizing pan B, over so-called squeeze rolls C to drying drums D, from whence the yarn passes over guide rolls F, and a cooling drum E back of the final guide roll F, onto a loom beam $aa$. The drying rolls D are heated by steam supplied through a pipe $d$ at a rate regulated by a control valve $d'$ which automatically regulates the steam supply as required to maintain a predetermined steam pressure in the drums D. The moisture content of the warp yarn as it passes from the slasher proper to the warp beam $aa$, is measured, by measuring the electrical conductivity of the warp yarn as it passes over the final guide roll F of the slasher.

To measure the electrical conductivity of the warp passing over the final guideroll F, I employ an electrode or contact in the form of a conducting roll G which is held in contact with the warp passing between it and the final guide roll F by a suitable bias force, due, as shown, partly to gravity and partly to spring action. The final guide roll F is connected to ground in ordinary practice, as a result of the grounding of the slasher frame in which the guide roll is journalled. The roll G is connected by a conductor 3 to a measuring circuit device H, including means for amplifying variations in the current which flows through, and varies with the conductivity of, the warp passing between the roll G and adjacent roll F. The conductivity of the warp is increased by an increase in the moisture content of the warp. The device H has a ground connection 3A. The current amplified by the device H is measured by an electrical measuring instrument I, which may be of any suitable available type, and as shown is a "Brown potentiometer" control instrument of commercial type, one form of which is disclosed in the Harrison Patent 1,946,280 of February 6, 1934. When the instrument I is a control instrument, it may include provisions for automatically adjusting the operation of the slasher, as required to maintain the moisture content of the warp in engagement with the contact roll G at an approximately constant predetermined value, or the measurements furnished by the instrument I may be utilized in the manual control of the slasher operation.

In Fig. 2, I have illustrated one form of means for controlling the moisture content in the warp leaving the slasher, by automatically varying the speed of rotation of the drying drums D, and thereby varying the speed of travel through the slasher of the web A. In the type of slasher collectively illustrated in Figs. 1 and 2, the various rolls or drums D are geared together and the shaft D' of the final drum D is driven by a constant speed motor J, through a variable speed drive of the well known Reeves type, comprising axially adjustable cone pulleys $D^2$ and $D^3$ on the shaft D', and $J^2$ and $J^3$ on the shaft J' of the motor J, and a connecting belt JD. The pulleys $D^2$ and $J^2$ are connected by a lever $J^4$ having a fulcrum $J^5$ between the shafts J' and D', and the pulleys $D^3$ and $J^3$ are similarly connected by a second lever $J^4$. Each of the pulleys $J^2$ and $J^3$ is connected to one end of a corresponding lever $J^6$, pivoted at $J^7$, intermediate its ends. The ends of the two levers $J^6$, remote from the shaft J' are connected by a turn buckle $J^8$, carrying a spur gear in mesh with and rotated by a gear K' carried by the armature shaft of reversible control motor K.

The motor K, as shown, is energized from supply conductors 1 and 2, for operation in one direction or the other by the closure of one or the other of two control switches IA and IB.

In operation, when the moisture content of the warp yarn engaging the contact roll G is greater than is desirable, the switch IA is closed, and the motor K then operates in the direction to increase the distance between the pulleys $J^2$ and $J^3$, and correspondingly reduce the distance between the pulleys $D^2$ and $D^3$, and thereby reduce the speed of the drying rolls D. This increases the time period during which the web is in contact with the drying rolls D, and thus increases the web drying effects of the rolls, so that the moisture content of the warp leaving the rolls is decreased. Conversely, when the moisture content of the warp engaging the contact roller G is less than is desirable, the switch IB is closed, and the motor K is operated in the direction to move the pulleys $J^2$ and $J^3$ closer together and to spread the pulleys $D^2$ and $D^3$ farther apart, and thus increases the speed and reduces the web drying effect of the rolls D, so that the moisture content of the web passing the contact roller G is increased.

As shown, the energizing circuit for the motor K, established when the switch IA is closed, includes supply conductor 2, switch IA, terminal conductor 4 for one winding of the motor K, terminal conductor 5, switch 6, and supply conductor 1. When the switch IB is closed, the motor is energized through a circuit including the supply conductor 2, switch IB, terminal conductor 7 for a second winding of the motor K, the common terminal conductor 5, switch 6, and supply conductor 1.

The switch 6 may be actuated manually, or automatically as hereinafter described to disconnect the conductor 5 and conductor 1 and to connect the latter to the supply conductor 2 through an alarm circuit 8 including a signal lamp 9 and a bell 9', to thereby indicate that the speed of the driven shaft D' is no longer subject to the automatic control effected through the motor K. The switches IA and IB may be included in and automatically actuated by the instrument I, generally as control switches are included in and actuated by the control mechanism of said Patent 1,946,280, as the warp moisture content rises above or falls below its predetermined desirable range. Inasmuch, however, as arrangements for the automatic adjustment of control switches in response to variations in a control quantity measured by a control instrument, are well known, and the details of the means for thus controlling the adjustment switches IA and IB form no part of the present invention, further reference to such details is unnecessary herein.

The electrical current measuring and amplifying circuit included in the device H may take various forms, some of which are illustrated diagrammatically in Figs. 3–8. The circuit arrangement shown in Fig. 3, comprises a balanced Wheatstone bridge L, two adjacent arms of which include balanced triode tube elements M and $m$, respectively, of the hot-cathode type. The other two bridge arms include resistances R' and $R^2$, respectively in series with the elements $m$ and M, and of equal value. The opposed normally equipotential junctions L' and $L^2$ of the bridge L, are connected by conductors 10 and $10^1$, to the terminals of a galvanometer N. The other two opposed junctions $L^3$ and $L^4$ of the bridge, are connected to a suitable source of direct current, which, in the form shown, comprises a power transformer O having its primary O', connected between supply conductors 1 and 2, and having the terminals of a secondary winding $O^2$ connected to the plates or anodes P' and $P^2$ of a rectifier tube P. The filament of tube P is connected through an inductance Q and conductor 12 to the bridge junction $L^4$ which is also connected to ground by conductor 3A. The intermediate meeting point of the secondary winding $O^2$ is connected by a conductor 11, to one end of a slide wire resistance $R^4$ which has its other end connected by a resistance $R^5$ to the bridge junction point $L^3$. The power transformer O also includes secondary windings $O^3$ and $O^4$. The winding $O^3$ supplies current to the rectifier tube filament $P^3$, and the winding $O^4$ supplies current through conductors 13 and 14 to the filaments, or heating elements, M' and $m'$ of the triodes M and $m$, respectively.

The cathodes $M^2$ and $m^2$ of the triodes M and $m$ are connected to the bridge junction $L^3$. The plates $M^3$ and $m^3$ of the triodes M and $m$ are respectively connected to the bridge junctions $L^2$ and $L^1$. The grid $M^4$ of the triode M is connected to ground through the conductor 3 and the warp in engagement with the contact roll G, the warp resistance, which varies with the warp moisture content, being diagrammatically illustrated in Fig. 3 as the resistance RX. It will be understood that the invention is equally adaptable for measurement of the moisture content of lumber and other similar materials and that the resistance RX may be the electrical resistance between two spikes at a predetermined distance apart driven into a sample of the lumber, the moisture content of which it is desired to measure. The grid $M^4$ is also connected, as shown in Fig. 3, through a resistance $R^3$ and the conductor 15 to a movable contact S in engagement with the slide wire resistance $R^4$. The grid $m^4$ of the triode is connected by a conductor 16 to the connected terminals of the resistance $R^4$ and $R^5$.

As previously indicated, the triodes M and $m$ should be balanced, or matched, so that they have similar characteristics, and to this end they are both preferably contained in the envelope of a twin triode tube, since the desired identity in characteristics of the two triodes is more certainly insured by enclosing them in the same tube than if enclosed in separate tubes. In adition to other hereinafter mentioned purposes served, the connection of the resistance RX and $R^3$ in series between the conductor 11 and ground serve a bleeder circuit purpose, which assists in smoothing out ripples in the rectified voltage not corrected for by the filter comprising the inductance Q and the condensers Q', through which the terminals of the inductance Q are connected to the rectifier output conductor 11. In consequence of the provisions described, the rectifier impresses a pure direct current voltage on the bridge junctions $L^3$ and $L^4$.

Since the bridge junction $L^3$ is connected through the resistance $R^5$ and $R^4$ and conductor 11 to the negative side of the current supplying rectifier, each of the grids $M^4$ and $m^4$ has a potential which is negative with respect to the potential of the corresponding cathode $M^2$ and $m^2$ respectively. In practice, I have found it satisfactory and desirable to use a resistance $R^5$ of such value, that in the normal balanced condition of the bridge, there is a potential difference of about 1.25 volts between the grid $M^4$ and cathode $M^2$ and between the grid $m^4$ and cathode $m^2$. In practice, the measuring circuit is so adjusted that the potential drop in the resistance RX will be approximately 200 volts, since that voltage between the contact roll G and cooperating grounded guideroll F has been found to be practically suitable and desirable, in the operation of the apparatus illustrated in Fig. 1, when the device of Fig. 3 is employed.

In operation with the normal balanced condition of the Wheatstone bridge circuit shown in Fig. 3, since the grids $M^4$ and $m^4$ are similarly negative relative to their respective cathodes $M^2$ and $m^2$, the similar triodes M and $m$ are equally conductive, and the current flows through the bridge arm resistance R' and $R^2$ are equal and the bridge junction points L' and $L^2$ are therefore at the same potential and the pointer N' of the galvanometer N will then be in its neutral or zero position. On a decrease in the moisture content of the warp in contact with the roller G, the increase in the value of the resistance RX of the Fig. 3 diagram, results in an increased potential drop in the resistance RX, and thus increases the extent to which the potential of the grid $M^4$ is negative relative to the cathode $M^2$, and diminishes the conductivity of the triode M, and makes the potential of the bridge junction point $L^2$ higher than the potential of the junction L'. Furthermore, the potential difference between bridge junctions L' and $L^2$ due to the increased potential drop in the resistance RX, will be amplified, since the decrease in the current flow through the triode M decreases the current flow through the resistance $R^5$, and thereby increases the potential of the grid $m^4$ relative to the potential of the cathode $m^2$, and thereby makes the triode $m$ more conductive. The resultant increase in the current flow through the resistance $R^2$, lowers the potential of the junction point L'. Conversely, an increase in the moisture content of the warp in contact with the roll G and the resultant reduction in the value of the resistance RX, increases the potential of the junction point L' and decreases the potential of the bridge junction $L^2$.

The pointer N' of the galvanometer N will deflect in one direction, or in the opposite direction, from its neutral position, as the potential of the bridge junction L' rises or falls below the potential of the junction $L^2$, and the deflective position of the pointer N' might be relied upon to furnish an indication of the magnitude of the moisture content of the warp, or extent of its departure from a predetermined value thereof, if the circuit included no rebalancing provisions. A more accurate measure of the moisture content variation is furnished in the circuit shown in Fig. 3, by the adjustment position of the movable contact S, when the latter is adjusted as required to rebalance the bridge, following any change in the warp moisture content and value of the resistance RX.

When the Wheatstone bridge of Fig. 3 is unbalanced as a result of a decrease in the moisture content of the warp, and consequent increase in the resistance value of, and potential drop through, the resistance RX, the bridge may be rebalanced by adjusting the contact S to the right as seen in Fig. 3. That adjustment has the effect of making the grid $M^4$ less negative relative to the cathode $M^2$, and thus increases the conductivity of the triode M. The resultant increase in current flow through the triode M and resistance R', reduces the potential difference between the junctions L' and $L^2$ by increasing the potential of the junction $L^2$, and, also, by reducing the potential of junction L', since the increase in current flow through the resistance $R^5$, diminishes the potential difference between the cathode $m^2$ and grid $m^4$, and thus diminishes the current flow through the triode $m$ and resistance $R^2$, and thereby diminishes the potential of the junction L'. Conversely, when the bridge is unbalanced as a result of an increase in the warp moisture content and resultant reduction in the value of the resistance RX, making the potential of the bridge junction $L^2$ lower than that of the bridge junction L', the bridge may be rebalanced by a suitable adjustment of the contact S to the left as seen in Fig. 3.

When following a change in the warp moisture content and resultant unbalancing of the bridge, the latter is rebalanced as above described, by a suitable corresponding adjustment of the contact S, the normal potential difference, assumed to be 1.25 volts, is re-established between each of the cathodes $M^2$ and $m^2$ and the corresponding grid $M^4$ and $m^4$, respectively. In consequence, as those skilled in the art will recognize, the attainment of balance does not depend upon the precise voltage impressed on the bridge, and ordinary fluctuations in a commercial source of current which may be employed to energize the power transformer primary O', will not effect the accuracy of the measurements obtained.

Preferably, the contact S is automatically adjusted as required to rebalance the bridge. To this end, in the arrangement shown diagrammatically in Fig. 3, the galvanometer N is adapted, on the deflection of its pointer N' in one direction or the other from its normal neutral, or zero position, to energize a reversible electric motor $s$ for operation in one direction or in the opposite direction. As diagrammatically shown, the motor $s$ comprises two rotors on the same rotor shaft, and separate energizing windings 17 and 18 respectively coacting with the two rotors, and each connected at one end to a supply conductor 1. The cooperating supply conductor 2 is connected to the galvanometer pointer N', which engages the second end of, and thereby energizes one or the other of the windings 17 and 18, on the deflection of the pointer in one direction or the other from its neutral, or zero, position. The rotor shaft is threaded, and is screwed through a nut s', which is adjusted longitudinally of the shaft, when the latter is rotated. The nut s' carries the contact S. On the assumption that a decrease in the warp moisture content results in a counter-clockwise deflection of a pointer N', bringing the latter into engagement with a second terminal of the winding 17, the motor $s$ then operates in the direction to adjust the contact S to the right, as a result of the fact that the winding 17 is then connected between the supply conductors 1 and 2. Conversely, on an increase in the warp moisture content and the clockwise deflection of the pointer N' from its neutral position into engagement with the second terminal of winding 18, the motor $s$ is then set into rotation in the direction to rebalance the bridge by adjusting the contact S to the left.

As will be apparent the motor $s$ may be suitably connected to control switches IA and IB, which may be identical with the correspondingly identified parts of Fig. 2 and made to operate one or the other of the control switches into closed position, while simultaneously effecting balancing adjustments of the contact S along slidewire resistance $R^4$, to thereby effect variations in the speed of the drying rolls D and hence to effect variations in the web drying effect of the rolls. In Fig. 3 the control switches IA and IB have been shown as mounted on a circular disc IC which is connected through suitable gearing to the shaft of the motor $s$. The control switches are so mounted that as the motor causes balancing adjustments of the contact S in one direction or the other from a predetermined position along the resistance $R^4$, corresponding to the desired moisture content value, one or the other of the control switches will be actuated into its closed position and a corresponding adjustment of the web drying effect of the rolls will be effected to restore the moisture content to said value.

For example, when the warp moisture content becomes greater than is desirable, the motor $s$ will be energized for rotation in the proper direction to cause a balancing adjustment of the contact S to the left as seen in Fig. 3 and to simultaneously cause rotation of the disc IC in a clockwise direction for actuating the switch IA into closed position. The control switches IA and IB of Fig. 3 may be connected as shown in Fig. 2 to a motor K and the supply lines 1 and 2 so that closure of one or the other results in energization of the motor K in the proper direction to effect the desired change in the web drying effect of the rolls. Closure of the switch IA will then cause a reduction in the speed of the drying rolls D, resulting in a decrease in moisture content of the warp. Conversely closure of the switch IB will cause an increase in the speed of the drying rolls and thereby result in a higher value of moisture content in the warp.

The motor s is energized by supply conductors 1 and 2, the supply conductor 1 being connected by a common terminal conductor 19 to one terminal of each of the windings 17 and 18, while the supply conductor 2 is connected to the galvanometer pointer N'. On a deflection of the pointer from its neutral position in the counterclockwise direction, the pointer engages the second terminal of the winding 17 and energizes the latter, and on a deflection in the clockwise direction, the pointer engages the second terminal of, and energizes the winding 18. On the assumption that the pointer deflects clockwise and counterclockwise as the warp moisture content increases and decreases, respectively, on the energization of winding 17, the motor s operates in the direction to adjust the contact S to the right, and operates in the direction to adjust the contact S to the left, when the winding 18 is energized.

In lieu of the relay mechanism including the galvanometer controlled reversible motor s, shown in Fig. 3, other forms of galvanometer controlled relay mechanisms may be employed to automatically adjust the contact S. Thus, for example, when the potentiometer I is of the commercial "Brown potentiometer" type, comprising a relay mechanism, including as its actuating element a constantly rotating shaft, which intermittently rebalances a potentiometer circuit in response to deflection of the instrument galvanometer associated with that circuit, the instrument can be used without change other than in its circuit connections, to effect the slide wire resistance adjustment purposes, effected in Fig. 3, by the use of the galvanometer controlled motor s.

In the modified circuit arrangement shown in Fig. 4, use is made of a Wheatstone bridge L like that of Fig. 3, but the warp moisture responsive resistance RX is included in, and forms one arm of a second Wheatstone bridge. The normally equi-potential junctions, $L^5$ and $L^6$, of the latter are respectively connected to the grids $m^4$ and $M^4$ of the triode elements $m$ and $M$. The other two junctions, $L^7$ and $L^8$ of the second bridge, are connecetd to the junctions $L^3$ and $L^4$ respectively of the bridge L, the junction $L^7$ being connected directly to the conductor 11 and being connected to the junction $L^3$ by the resistance $R^5$. The resistance $R^4$ of Fig. 3 is replaced in Fig. 4 by a variable slide wire resistance $R^6$, engaged by an adjustable contact SA. The resistance $R^6$ is connected to the bridge junction $L^7$, and in connection with the contact SA and resistance $R^3$, forms the arm of the second bridge between the junctions $L^7$ and $L^6$, and in series with the bridge arm including the resistance RX between the energizing conductors 11 and 12. The arm of the second bridge between the junctions $L^7$ and $L^5$, is formed by a fixed resistance $R^7$, and the fourth arm of the second bridge, between junctions $L^5$ and $L^8$, is formed by a second fixed resistance $R^8$.

As will be readily apparent to those skilled in the art, in the operation of the apparatus shown in Fig. 4, a variation in the warp moisture responsive resistance RX, unbalances both bridges, and each bridge is rebalanced by an adjustment of the contact SA reestablishing a ratio of the resistance in the bridge arm including the variable slide wire resistance $R^6$ to the resistance RX, equal to the ratio of the resistance $R^7$ and $R^8$. The galvanometer N of the bridge L of Fig. 4, may effect rebalancing adjustments of the contact SA, through the same means through which it effects the adjustments of the contact S in Fig. 3.

The modified circuit arrangement shown in Fig. 5, comprises three Wheatstone bridge circuits, and is the circuit arrangement which I now consider preferable for use in measuring warp moisture content as illustrated in Fig. 1, because of its inherent stability, the ease with which it may be calibrated, and other advantageous characteristics hereinafter referred to. The circuit arrangement shown in Fig. 5 comprises a bridge connected to a galvanometer N, shown as exactly like the bridge L of Fig. 3, except that for calibration purposes, the bridge arm resistances R' and $R^2$ are connected by a resistance $R^9$ engaged by an adjustable contact T. The variable point of engagement of the latter with the resistance $R^9$ corresponds to the bridge junction point $L^4$ of Fig. 3.

The second bridge circuit of Fig. 5 includes resistances $R^7$ and $R^8$ and associated bridge junctions $L^5$, $L^7$, and $L^8$ as in Fig. 4, but in Fig. 5, the junction $L^6$ of the second bridge is also a junction of the third bridge, resistance portions of which are included in the arms of the second bridge by which the junction $L^6$ is connected to the second bridge junctions $L^7$ and $L^8$. In Fig. 5, the second bridge junction point $L^7$ is connected to ground by the conductor 3A, and is connected to the junction $L^6$ by a fixed resistance $R^{10}$. The junction $L^7$ is also connected by the warp moisture responsive resistance RX and a resistance $R^{11}$ in series therewith to the junction $L^9$ of the third bridge, opposite to the junction $L^6$ of the latter. The junction $L^6$ is connected to the second bridge junction $L^8$, by three resistances in series, namely, a fixed resistance $R^{12}$, a resistance $R^{13}$, and a variable portion of a slide wire resistance $R^{14}$ which is connected at one end to the junction point $L^6$, and is engaged by an adjustable contact TA connected to the end of the resistance $R^{13}$ opposite to that connected to the resistance $R^{12}$. As hereinafter explained, the contact TA is adjusted for calibration purposes. The resistance $R^{13}$ is a slide wire resistance engaged by a contact SB, which is adjusted for bridge rebalancing purposes, and is connected by the fixed resistance $R^3$ to the junction $L^9$ of the third bridge. Three arms of the third bridge are thus formed by the resistances $R^{10}$, RX and $R^{11}$, and $R^3$, respectively, while the fourth arm of the third bridge includes more or less of the resistances $R^{13}$ and $R^{14}$, depending on the adjustments of the contacts SB and TA respectively. The third bridge junction $L^6$ and $L^9$ are connected by a fixed resistance $R^{15}$, which forms a relatively low resistance connection between the junctions $L^6$ and $L^9$, and desensitizes the apparatus by preventing the voltage variations or swings of the grids $m^4$ and $M^4$ from being as great as they would be if the resistance $R^{15}$ were omitted.

In the circuit arrangement of Fig. 5, the energizing conductors 11 and 12 are connected to the second bridge junctions $L^7$ and $L^8$, respectively. The first bridge, including the triode elements M and $m$, is energized through the conductor 20, connecting the junction $L^5$ to the junction $L^3$, and the conductor 21, connecting the adjustable contact T to the junction $L^8$. The grid $m^4$ of the triode $m$ is connected by a conductor 22 to the common junction $L^6$ of the second and third bridges, and the grid $M^4$ of the triode M is connected by a conductor 23 to the junction $L^9$ of the third bridge. The third bridge normally has its junctions $L^6$ and $L^9$ at the same potential, and is energized by the connections between its other two junctions and the second bridge junctions $L^7$ and $L^8$.

As will be apparent, a variation in the value of the warp moisture responsive resistance RX of Fig. 5, unbalances the third bridge, and thereby unbalances the bridge including the triodes M and $m$. When the third bridge is thus unbalanced, it may be rebalanced by a suitable adjustment of the contact SB, and the rebalancing of the third bridge rebalances the bridge including the triodes. The contact SB may be automatically adjusted as required for bridge rebalancing purposes, by a relay mechanism, which is controlled by the galvanometer N associated with the bridge including the triodes M and $m$, and which may be of the character employed to adjust the contact S of Fig. 3. The bridge, referred to above as the second bridge of Fig. 5, is not balanced as are the other bridges, since its junctions $L^5$ and $L^6$ are necessarily maintained at different potentials, to maintain the desired difference of approximately 1.25 volts between the cathode and grid of both of the triodes $m$ and M.

As will be apparent, the operation of the arrangement of Fig. 5 is generally like the arrangement of Fig. 3, but the arrangement of Fig. 5 has advantageous characteristics not possessed by the arrangement of Fig. 3 which facilitate calibrating adjustments of the measuring circuit, and which are of especial utility in measuring moisture content by extending or elongating the range of moisture content possible of measurement, or in other words causing a reduction of the sensitivity of the final measuring instrument as alluded to hereinbefore. This feature is of particular importance in measuring the moisture content of materials which ordinarily vary in electrical resistance from a high value of approximately 1000 megohms to a low value of about 1 megohm over a very narrow range of moisture content.

The means by which the range of moisture content possible of measurement is so elongated includes the resistor $R^{11}$ which, as shown in Fig. 5, is connected in the bridge arm including the web resistance RX. With a constant voltage applied to the web the electrical resistance of the web varies in a definite manner in relation to the moisture content thereof until a critical value of moisture content of the web or fiber saturation point is reached. At this value of moisture content the electrical resistance of the web falls off rapidly with further increase of moisture content so that it is virtually impossible to measure further increases in moisture content by means of measuring the electrical resistance of the web. As the moisture content of the material varies, however, the voltage required to cause breakdown varies, that is, at higher values of moisture content the voltage required to cause breakdown will be lower than that required at lower values of moisture content. Thus, if the voltage applied to the web is reduced as the moisture content increases, the breakdown of the web may be delayed and greater variations in moisture content may be measured.

The resistance $R^{11}$ of Fig. 5 is employed primarily for this purpose. As the moisture content of the web varies, more or less of the total voltage across the bridge arm including the resistance $R^{11}$ and the web resistance RX appears across the resistance $R^{11}$. When the moisture content increases, for example, the resistance RX decreases and the current flow therethrough increases proportionately. As a result the voltage drop across the resistance $R^{11}$ increases and the voltage drop across the resistance RX decreases. When the bridge including these resistances is balanced, the total voltage drop across bridge arm including the resistances $R^{11}$ and RX is 90 volts and after an increase in moisture content, the current flow through these resistances with the bridge again balanced will be of such value that more of the 90 volts will appear across the resistance $R^{11}$ and less across the resistance RX.

By properly proportioning the resistance $R^{11}$ in relation to the remaining bridge circuit resistances and to the particular web material or substance under measurement, the degree to which the breakdown point of the web is varied may be made an optimum value and thereby the range of moisture content variation of the web within a predetermined variation in electrical resistance may be made an optimum value.

Furthermore, it will be noted that as balancing adjustments of the contact SB are made along the resistance $R^{13}$, the voltage applied to the bridge arms including resistances RX and $R^3$, respectively, is varied, or in other words the voltage applied to the bridge including the resistance RX is varied. This variation in bridge energizing voltage is had in such a manner, however, that the current flow through the resistance $R^{10}$ and hence, the voltage drop thereacross, remains substantially constant. The effect of so varying the current flow through only two arms of the bridge, that is, through the arms including the resistances RX, $R^{11}$ and $R^3$, is to augment the effect produced by the insertion of resistance $R^{11}$ in the circuit. For example, when the moisture content of the material under measurement increases and the resistance RX becomes smaller in value, resulting in an increase in current flow and an increase in the potential drop across the bridge arm including the resistance RX, the adjustment of the contact SB required to effect bridge rebalance will be in a direction to the left of the resistance $R^{13}$ as seen in Fig. 5. It will be noted that when the contact SB is moved in this direction the voltage applied to the bridge is reduced and that a reduction in the current flow through the bridge arms including resistances RX and $R^3$ is effected, which reduction in current flow is just sufficient to restore the voltage drop across the resistances RX and $R^{11}$ to 90 volts. Thus the decrease in the potential drop across the resistance RX produced by the presence of the resistance $R^{11}$ is further supplemented by a decrease in the bridge energizing voltage, and the breakdown of the material under measurement is further delayed to thereby permit the measurement of moisture content variation of the material over a wider range.

The operation of the bridge including the resistance RX is thus seen to be different from the ordinary Wheatstone bridge in which the voltage applied to the bridge is maintained constant and the bridge balancing adjustments required upon changes in the resistance of a variable arm are effected by means of varying the resistance in an oppositely disposed arm. As has been noted hereinbefore the balancing adjustments of the bridge arrangement including the resistance RX shown in Fig. 5 are effected by variations in the voltage applied to the bridge, the voltage drop across one arm of the bridge, that is across the resistance R¹⁰, meanwhile being maintained substantially constant. As will be explained hereinafter the current flow through the bridge arms including the resistance R¹⁰ is extremely large in comparison to the current flow through the resistances RX, R¹¹ and R³ so that variations in the current flow through the latter resistances will have a negligible effect on the current flow through the resistance R¹⁰ and the voltage drop across the latter will remain substantially constant.

The provision of the resistance R⁹ and contact T permit of an easy initial adjustment of the circuit to insure equality in resistance of those arms of the bridge to which the galvanometer N is connected, which connect the junctions L¹ and L² to the adjustable contact T. The position of the contact T required for this purpose may be quickly and easily determined by temporarily connecting the third bridge junctions L⁶ and L⁹ by a low resistance shunt, and then adjusting the contact T to the position at which the galvanometer N gives zero deflection. With the circuit thus adjusted, the pointer of the galvanometer N will occupy its zero position when the bridges are balanced and the junction points L⁶ and L⁹ are at the same potential.

In the operation of the apparatus shown in Fig. 5, the moisture measuring, operative scale range, is determined by the extent of movement of the contact SB along the resistance R¹³, required for bridge balancing purposes as the warp moisture content varies between the minimum and maximum values thereof, which are measured by the apparatus. As those skilled in the measuring art will understand, it is ordinarily desirable that the contact SB, or S, should be in or near its midscale position, for the moisture content value which is average or normal for the conditions of use. By adjustment of the contact TA along the resistance R¹⁴, the operating scale range of the instrument may be shifted as required. As will be apparent, an adjustment of the contact TA to increase or decrease the amount of resistance R¹⁴ in use will require a corresponding adjustment of the contact SB along the resistance R¹³ to balance the bridges. If the resistance R¹⁴ is suitably related to the resistances R¹³ and R¹², the adjustment of the contact TA will change the scale range of the apparatus without significantly affecting scale values, or extent of movement of the contact SB required to rebalance the bridge following a given change in the warp moisture content.

It is practically important that suitable resistance values should be chosen for the various bridge resistances in the circuit shown in Fig. 5, and in determining those values, or circuit constants, account should be taken of the fact, that in the practical operation of such a slasher as is shown in Fig. 1, closely adjacent portions of the warp may vary widely in their moisture content. Furthermore, the important measurements are not measurements of the moisture contents of small individual portions of the web, but are measurements of the average web moisture content, from which the trend of change in the average moisture content of the web may be determined. The galvanometer N of Fig. 5, is thus desirably shunted by a condenser Q⁵, so that instantaneous changes in current flow through the galvanometer are damped out, and the galvanometer is made responsive to the average warp moisture content, rather than to the moisture contents of individual warp portions successively passing into engagement with the contact roller G.

In the use of the present invention, under certain conditions, it has been found that the value of the moisture responsive resistance RX may be expected to vary from zero up to a maximum of the order of one thousand megohms, and it has been found practically suitable and convenient to maintain a potential difference of about 90 volts between the points of the measuring circuit designated L⁷ and L⁶ in Fig. 5. With such a potential difference and such moisture responsive resistance variations, the values, other resistances, or constants, of the measuring circuit network shown in Fig. 5, may be approximately as follows, namely:

| | | |
|---|---|---|
| R' | ohms | 1,000 |
| R² | do | 1,000 |
| R³ | megohms | 2 |
| R⁷ | ohms | 2,700 |
| R⁸ | do | 7,300 |
| R⁹ | do | 400 |
| R¹⁰ | do | 3,645 |
| R¹¹ | megohms | 5 |
| R¹² | ohms | 7,460 |
| R¹³ | do | 1,450 |
| R¹⁴ | do | 7.25 |
| R¹⁵ | megohm | .5 |

The resistance values just stated are not necessarily optimum values, and some of said resistances may have values quite different from those stated, without significant effect on the general operation of the apparatus shown in Fig. 5. The values stated are practically suitable, however, for use under the conditions assumed, and it is practically desirable and important that the relative values of some of the resistances should be approximately as stated above, in order that the apparatus may have certain desirable characteristics.

With the above mentioned network values, in the bridge balanced condition of the apparatus, the current flow through each of the triode elements will be about two milliamperes, the current flow through resistance R⁷ will be about 34 milliamperes, and the current flow through the resistance R⁸ will be about 30 milliamperes. While those current flow values are not critical, or optimum, values, they are suitable values, and are desirably related values in that with them, a relatively large percentage change in the currents flowing through the triodes, results in but a relatively small percentage change in the current flow through, and in the potential drop in, the resistance R⁷, which helps in maintaining an approximately constant potential difference between the grid and cathode of each of the triodes M and m.

The stated values of resistances R¹¹, R³, and R¹³, are suitable, and suitably related, to avoid an objectionable variation in the negative direction of the potential of the grid M⁴ of the triode M when the moisture content of the warp is so high that the value of the resistance RX is or is near zero, and when the contact roller G directly engages the cooperating grounded guide roller F, and to permit of bridge balancing for all values of the resistance RX between zero and one thousand megohms, by adjustment of the contact SB between the right and left hand ends of the resistance R¹³ as seen in Fig. 5, without requiring an undesirably large potential drop in the resistance $R^{13}$. With the values stated above, the potential drop in the resistance $R^{13}$ is approximately 36 volts. It is desirable that the potential drop in the resistance $R^{13}$ should be of the order of 36 or 40 volts, so that with the individual swings of about 4 volts in the voltage of the grid $M^4$, ordinarily to be expected, the compensating adjustment movement of the contact SB need be for only a tenth or so of the length of the resistance $R^{13}$. In consequence, the recording pen of the instrument I, moving in accordance with the movement of the contact SB, traces a record from which the trend of the moisture content is plainly apparent, which would not be the case if the individual grid voltage swings were larger relative to the total range of adjustment of the contact SB and the recording pen.

With the assumptions that the values of the resistances $R^3$, and $R^{11}$, are 2 and 5 megohms, respectively, and that there is a constant potential drop of 90 volts in the bridge arm including the resistances RX and $R^{11}$, it is apparent that the voltage drop in the resistance $R^3$ will be 36 volts, with zero value of the resistance RX, and will be .179 when the resistance RX has its assumed maximum value of one thousand megohms.

With the bridge balanced, the potential drop in the bridge arm including the resistance $R^{14}$ is necessarily the same as in the arm including the resistance $R^3$. Since the same current flows through the bridge arm including the resistance $R^{14}$ and through the bridge arm including the resistance $R^{10}$, that current must be of constant value in order that the potential drop in the resistance $R^{10}$ is always 90 volts as is required for bridge balancing with a 90 volt drop in the bridge arm including the resistances RX and $R^{11}$. As is readily apparent, the total resistance in the bridge arm including the resistance $R^{14}$ must vary inversely with the sum of the resistances RX and $R^{11}$. With the apparatus calibrated so that all and none of the resistance $R^{13}$ is in the bridge arm including the resistance $R^{14}$ with the zero and maximum values of the resistance RX, respectively, it is apparent that the ratio of the sum of the resistances $R^{13}$ and $R^{14}$ to the resistance $R^{14}$, is the ratio of 36 to .179.

When employed in conjunction with a standard potentiometer instrument such as the Brown potentiometer mentioned hereinbefore which includes a slidewire resistance and means for causing adjusting movements of a contact along said resistance in response to galvanometer deflections, means are preferably provided for facilitating the adjustment of the voltage drop across the bridge arm including resistors $R^{13}$ and $R^{14}$ to 36 volts. The potentiometer slidewire resistance referred to may then be employed as resistor $R^{13}$ and the calibration adjustments greatly facilitated.

As seen in Fig. 5, means may be provided for this purpose by making the resistor $R^{12}$ slightly less than the value previously noted herein and inserting a variable resistance (not shown) between the resistors $R^{12}$ and $R^{13}$. By varying the resistance of this additional variable resistor, the current flow through the bridge arm including the resistors $R^{13}$ and $R^{14}$ may be adjusted to the value required to make the voltage drop across the latter resistors exactly 36 volts. When the voltage drop across this bridge arm has been so adjusted to 36 volts, it will be known that whenever the contact SB is at the right hand end of resistor $R^{13}$, that the resistance of $Rx$ is zero, and similarly that whenever the contact SB is at the left hand end of resistor $R^{13}$ that the resistance of $Rx$ is 1,000 megohms.

Since the voltage drop across the resistor $R^{14}$ is extremely small in comparison to the voltage drop across resistor $R^{13}$, the resistor $R^{14}$ may be dispensed with, if desired. If resistor $R^{14}$ is omitted error will be introduced in that the scale of values at the end of the resistor $R^{13}$ measuring high values of RX will be distorted, but the distortion will be so small as to be negligible for all practical purposes.

With the resistance values stated, it is apparent that the maximum value of the current flowing through the bridge arms including the resistances RX, $R^{11}$, and $R^3$ is very small, in comparison with the current flowing through the resistance $R^{10}$ and $R^{14}$. In consequence, variation in the first mentioned current, and in the position of the contact SB, have only an insignificant effect on the total potential drop in the bridge arm including the resistances $R^{14}$, $R^{13}$, and $R^{12}$. The variation in the first mentioned current with variation in the resistance of RX, however, is sufficient to cause the adjustment of the contact SB, required to rebalance the bridge following a change in the resistance of RX, to be nonlinear with respect to the change in resistance of RX. Further analysis of this bridge reveals that this relationship between the movement of contact SB, required to rebalance the bridge for a given change in resistance of RX, and a change in RX to be an inverse one. Over the range which it is ordinarily desired to commercially measure and/or control the moisture content of a web, a curve plotted between the moisture content of a web as abscissa and the electrical resistance thereof as ordinate, the curve closely approximates an inverse curve so that the movement of contact SB required to rebalance the bridge for a given change in moisture content is in substantially linear proportion with said change in moisture content.

Since the required circuit calibrating adjustments are simple and direct, and not highly critical after an initial apparatus has been given proper calibration adjustments determined by test operations, reproductions or duplicates of the initial apparatus may be properly calibrated, without test operations, by repeating in each, the calibration adjustments given the said initial apparatus.

The modified circuit arrangement shown in Fig. 6, is like that shown in Fig. 5, in respect to its bridge circuits but in Fig. 6, the bridge circuit measuring provisions are associated with a push-pull amplifying circuit. The latter includes thermionic tubes MA and $ma$, which control the supply energization of a relay mechanism, shown as a reversible electric alternating current motor U which is automatically energized to adjust the contact SB, when and as required to rebalance the bridge circuits. As shown, the tubes MA and $ma$ are of the filament heated, hot cathode type.

A conductor 24 connects the bridge junction $L^1$ to the control grid of the tube MA, so that said grid is given the potential of the plate $m^3$ of the tube $m$. Similarly, the control grid of the tube MA has the plate voltage of the tube M impressed on it by means of a conductor 25 connecting the bridge junction $L^2$ to the said control grid. The cathodes of the tubes MA and $ma$ are each connected by conductors 26 and 26' to the bridge junction $L^8$. The plates of the tube $ma$ and MA are connected by conductors 27 and 28, respectively, to the ends of the secondary winding $O^5$ of a transformer OA, which has its midpoint connected by a conductor 29, a winding U' of the Motor U, and a conductor 30, to the positive bridge energizing conductor 12, and thereby to the bridge junction L⁸. The primary winding O⁶ of the transformer OA is connected to single phase alternating current supply conductors 1 and 2. The motor or relay mechanism U may take various forms, but as shown, is a rotating field induction motor, including in addition to the winding U', a second winding U², which is connected to the supply conductors 1 and 2. As shown, the winding U² is connected to the supply conductor 1, through a condenser U³. The transformer secondary winding O⁵ supplies plate voltage to each of the tubes MA and ma.

In the normal operation of the arrangement shown in Fig. 6, when the bridge is balanced, the grids of the tubes MA and ma are at the same potential value, which is sufficiently negative, relative to the tube cathodes, to maintain each tube non-conductive throughout the full positive swing of the voltage supplied by the transformer secondary O⁵ to the plate of the tube, but on a change in the warp moisture content, and resultant unbalancing of the bridge circuit, the potential of the control grid of one or the other of the tubes MA and ma, will increase positively relative to the cathode of the tube to the critical value at which the tube becomes conductive. On the assumption, for example, that the bridge is unbalanced so as to increase the potential of the junction L', the tube ma will become conductive, and current will then flow between the plate and cathode of the tube during more or less of each half cycle in which the voltage applied to the plate is positive. The duration of each period in which current is thus passed by the tube ma, will increase and decrease with the extent of the voltage swing of the control grid of the tube ma, that extent depending in turn upon the extent of potential increase in the positive direction of the bridge junction L'.

In consequence of the described current flow through the tube ma, there will be a pulsating current flow through the motor winding U', which will be either in phase with, or 180° out of phase with, the current flow through the supply conductors 1 and 2, and the motor will then be energized for rotation in one particular direction. When the unbalance of the bridge circuit increases the potential of the junction L² positively, sufficiently to make the tube MA conductive, there will be a pulsating current flow through the winding U', which will be 180° out of phase with the pulsating current flow produced when the tube ma is rendered conductive. The motor will thus operate, when energized as a result of current flow through the tube MA in a direction opposite to that in which it operates when energized as a result of current flow through the tube ma.

As diagrammatically indicated, the rotation of the armature shaft U⁴ of the motor U effects rebalancing adjustments of the contact SB, and when as a result of such an adjustment, the bridge circuits are rebalanced, the normal potential of the control grids of the tubes MA and ma is restored, and each of those tubes ceases to be conductive.

In the circuit arrangements shown in Fig. 7, a motor U, which may be similar to that shown in Fig. 6, is employed to effect rebalancing adjustments of a contact SC, to thereby vary the amount of a slide wire resistance R¹⁸ included in one arm of a simple Wheatstone bridge, which includes the moisture responsive resistance RX in its opposing arm. The other two arms of the bridge are formed by resistances R¹⁶ and R³, each connected at one end to a corresponding end of the resistance RX. The second end of the resistance R³ is connected to the contact SC. The second end of the resistance R¹⁶ is connected by a resistance R¹⁷ to the resistance R¹⁸, so that the arm of the bridge which includes more or less of the resistance R¹⁸, also includes the resistance R¹⁷. The bridge is energized by direct current supply conductors 11 and 12, which may lead from a power unit like that shown in Fig. 3. The conductor 11 is connected to the bridge junction at which one end of the resistance RX is connected to one end of the resistance R¹⁶. The opposing bridge junction, to which the supply conductor 12 is connected is the point at which the contact SC engages the slide wire resistance R¹⁸. As shown, the negative bridge junction to which conductor 11 is connected, is grounded.

The bridge junction at which the resistances R¹⁶ and R¹⁷ are directly connected, is connected by a conductor 31, to the control grid $m^4$ of a triode element m like that employed in Fig. 3, and a cooperating triode M has its grid M⁴, connected by a conductor 32 to the bridge junction opposite to that to which the conductor 31 is connected. In the balanced condition of the bridge shown in Fig. 7, its junctions to which the control grids M⁴ and $m^4$ are connected, have the same potential. When the bridge is unbalanced as a result of an increase or decrease in the value of the resistance RX, the potential of the bridge junction to which the grid M⁴ is connected, is increased or decreased, respectively, relative to the potential of the bridge junction to which the grid $m^4$ is connected. The bridge is automatically rebalanced, following any change in the value of the resistance RX, by the motor U. The latter is then set into operation to adjust the contact SC in the proper direction, by the relative change then occurring in the bias potentials transmitted to the grids $m^4$ and M⁴ by the conductors 31 and 32.

The means through which the motor U of Fig. 7 is controlled by changes in the grid biases of triodes M and m, comprise a transformer OB having its primary winding O⁷ connected between the plate $m^3$ and M³ of triodes m and M. The cathodes of the triodes m and M are connected by a conductor 33, and are maintained at potentials suitably related to the corresponding grid potentials, by a conductor 33' which connects the conductor 33 to the connected terminals of the resistances R¹⁷ and R¹⁸. An alternating current voltage between the cathode and plate of each triode m and M, is created by supply conductors 1 and 2, connected one to the midpoint of the winding O⁷ and the other to the conductor 33. With the bridge balanced, pulsating currents flow through the two triodes, M and m and in the transformer primary O⁷, which are equal in magnitude, but opposite in direction, and hence have no resultant inductive effect on the transformer secondary O⁸. When the bridge is unbalanced, however, and the grid becomes more positive relative to the corresponding cathode, in one triode than in the other, one of the two pulsating currents flowing through the primary O⁷ will be significantly greater than the other, and an alternating current voltage will be induced in the secondary winding O⁸. That voltage will be in phase, or 180° out of phase, with the voltage of the supply conductors 1 and 2, accordingly as one or the other of the tubes M and $m$ supplies the dominating current to the winding $O^7$.

The end terminals of the secondary winding $O^8$ are connected by conductors 34 and 35 to the control grids of thermionic tubes MA and $ma$ which may be like the thermionic tubes MA and $ma$ of Fig. 6. The plates of the tubes MA and $ma$ of Fig. 7 are connected to the ends of the primary winding $O^9$ of a transformer OC. The secondary winding $O^{10}$ of that transformer has its ends connected to the ends of the winding U' of the motor U of Fig. 7. The positive side 12, of the direct current voltage bridge energizing source, is connected by a conductor 36 to the midpoint of the winding $O^9$. The cathodes of the tubes MA and $ma$ are each connected to a ground connection 37, and thereby to the negative side of the bridge energizing source of direct current, through a resistance $R^{19}$, and the midpoint of the secondary $O^8$ of transformer OB is also connected to the ground connection 37.

Normally, the grids of the tubes MA and $ma$ are thus maintained sufficiently negative with respect to the cathodes of the tubes, to keep the steady currents flowing through the tubes quite small. When the bridge of Fig. 7 is unbalanced, however, and the secondary winding $O^8$ induces an alternating voltage, the grid potential of one of the tubes MA and $ma$ swings positive, and as the grid potential of the other tube swings negative, during one half of each voltage cycle of the winding $O^8$, and during the succeeding half of the voltage cycle, the previous negative or positive swing of each grid potential is reversed. The tubes MA and $ma$ of Fig. 7 are thus made alternately conductive, and the resultant pulsating current flows through the primary winding $O^9$, induce an alternating current flow in the secondary winding $O^{10}$ great enough to adequately energize the motor winding U'.

Depending upon the direction of unbalance of the bridge of Fig. 7, the alternating current voltage induced in the winding $O^{10}$ will be in phase, or 180° out of phase with the voltage of the supply lines 1 and 2 supplying plate currents to the tubes M and $m$, and energizing the winding $U^2$ of the motor U. As will be apparent, the motor U will operate in one direction or the other accordingly as the voltages last mentioned are in phase, or are 180° out of phase with one another. As shown, condensers $Q^4$, $Q^5$, and $Q^6$, are connected in shunt to the resistance $R^{19}$, winding $O^8$, and winding $O^9$ respectively. The condenser $Q^5$ reduces the impedance of the winding $O^8$ to induced current flow therethrough, and renders the corresponding portion of the circuit resonant, so that the voltage impressed on the grids of the tubes MA and $ma$ will be precisely in, or 180° out of, phase with the voltage of the supply conductors 1 and 2. The condenser $Q^6$ reduces the impedance of the winding $O^9$ to the flow of pulsating current therethrough, and thus increases the magnitude of the current flow in the transformer and the secondary winding $O^{10}$.

In Fig. 8, I have illustrated a modification of the circuit arrangement of Fig. 5, including safety provisions of the character previously referred to in connection with Fig. 2. The bridge arms which in Fig. 5 include the resistances R' and $R^2$ in Fig. 8 include resistances $R^{21}$ and $R^{22}$, respectively, which are arranged to form a pair of aligned relay coils or windings, so wound that each creates a magnetic field opposing that created by the other. The pivoted armature 6 is in inductive relation with the coils $R^{21}$ and $R^{22}$, and also in inductive relation with a coil $R^{23}$. The latter is energized by current flow through the conductor 20 connecting the bridge junction $L^5$ to the cathodes of the tubes M and $m$ of Fig. 8. As shown, the coil $R^{23}$ is connected in shunt to a resistance $R^{24}$, connecting, and in series with, sections of the conductor 20.

The armature 6 is biased for counterclockwise movement from the position in which it is shown in Figs. 2 and 8 and in which it permits energization of the motor K into the position in which it is adapted to energize the alarm circuit including the devices 9 and 9' of Fig. 2. In the normal operating condition of the apparatus, the armature is tilted clockwise into the positions shown in Figs. 2 and 8 by the inductive action of the coil $R^{23}$, the inductive actions on the armature of the coils $R^{21}$ and $R^{22}$ then neutralizing one another. When either one of the two triodes M and $m$ burns out, or otherwise fails, the resultant deenergization of the corresponding one of the windings $R^{21}$ and $R^{22}$, leaves the armature subject to the inductive effect of the other of those windings, and that effect is strong enough to balance or over-balance the action of the winding $R^{23}$, so that the armature 6 then tilts counterclockwise into the position in which it prevents energization of the motor K, and energizes the alarm devices 9 and 9'. If both triodes fail, the coil $R^{23}$ as well as each of the coils $R^{21}$ and $R^{22}$ will be deenergized, as will happed if the energizing voltage fails. If the contact roller G and cooperating guide roller F directly engage, or are otherwise short circuited, the resultant potential increase negatively of the grid $M^4$ will reduce the current flow in coil $R^{21}$ approximately to zero and the coil $R^{22}$ will then pull the armature 6 counterclockwise. In operation, as a result of an injury to either tube or failure of the network energizing source, or an open circuit or short circuit in the circuit network, the winding $R^{23}$ is de-energized and the armature 6 is free to turn under its bias force.

In Fig. 8, the resistance $R^3$ has taps 40 connected to it at intervals along its length. Said taps terminate in switch terminals 41 one or another of which may be by a manually adjustable switch arm 42 connected to one end of the moisture responsive resistance RX. In consequence, the portion or amount of the resistance $R^3$ which is connected in series with the resistance RX between the ground connection 3A and the contact SB, depends upon the adjustment of the switch arm 42. By the adjustment of the latter, the apparatus may thus be calibrated to adapt it to use under operating conditions in which different amounts of the resistance $R^3$ are desirably connected in series with the resistance RX.

The modification shown in Fig. 9, comprises a calibrating provision analogous to those of Fig. 8 just described, but differing therefrom in that the manually adjustable switch arm 43 of Fig. 9 is adjustable to short circuit the portion of the resistance $R^3$ between one or another of adjacent pairs of taps 40 connecting different points along the length of that resistance to the switch contacts 41.

The modification illustrated in Fig. 9 also includes safety provisions alternative to those shown in Fig. 8. In Fig. 9, the winding $R^{23}$ is omitted and the windings $R^{21}$ and $R^{22}$ exert inductive pulls on the opposite ends of the armature 6, which is biased for counterclockwise movements into the position in which it prevents energization of the motor K of Fig. 2. The armature 6 is also given a counterclockwise turning tendency by the action of the winding $R^{21}$. Under normal operating conditions, however, the armature is held in its clockwise position shown in Fig. 9 by the inductive action of the winding $R^{22}$, which acts more strongly on the armature than does the winding $R^{21}$. With the arrangement shown in Fig. 9, when both of the tubes M and $m$ become inoperative as a result of voltage failure, or otherwise, the armature 6 turns counterclockwise out of the position shown, under its bias force. In case of failure of the tube $m$, the armature turns counterclockwise under its bias force when supplemented by the inductive action of the winding $R^{21}$. The armature 6 is also given its counterclockwise movement in the event of a short circuit connection between the contact roller G and cooperating guide roll F, as a result of the abnormal increase in the current flow through the tube M, which then occurs, the ground connection 3A being at the positive side of the circuit network in Fig. 9. That current flow increase makes the inductive action of the winding $R^{21}$ greater than that of the winding $R^{22}$, and thereby results in counterclockwise movement of the armature 6.

In Fig. 10, a modification including safety provisions alternative to those shown in Figs. 2, 8 and 9 has been illustrated. In Fig. 10 a pivoted armature 6', which may be employed in lieu of the armature 6 of Figs. 8 and 9, is biased for counterclockwise movement from the position in which it is shown and in which it permits selective energization of the motor K into a position in which it is adapted to energize the motor K for rotation in a direction to reduce the speed of the drying rolls and to simultaneously effect the closure of the steam control valve $d'$ which controls the admission of steam to the drying rolls D as shown in Fig. 1. For the purpose of indicating that the automatic control of the warp moisture content is no longer effected by the motor K and that the steam supply valve has been closed, an alarm 9, shown as a signal lamp, is preferably also energized when the armature 6' is biased into its counterclockwise position.

For the purpose of explaining the operation of the modification of Fig. 10 the armature 6' may be assumed to be employed in lieu of the armature 6 in Fig. 8. In the normal operating condition of the apparatus the armature 6' will thus be tilted into the clockwise position shown by the inductive action of the coil $R^{23}$, the inductive effects of the coils $R^{21}$ and $R^{22}$ neutralizing one another. In this position of the armature 6' the web drying effect of the rolls D may be controlled by the galvanometer N as shown in Fig. 3, for example, or by means of the Brown potentiometer instrument referred to. Irrespective of the manner in which the galvanometer N is made to control the web drying effect, however, deflections of the galvanometer pointer N' in one direction or the other from a predetermined position will result in the actuation of one or the other of the control switches IA and IB which normally control the energization of the motor K.

As shown in Fig. 10 the armature 6' is comprised of two sections, each of which is normally suitably insulated from the other. One of the sections is connected to the supply conductor 2 and the other is adapted when the armature 6' is in its furthermost clockwise position to complete a circuit from one winding of the motor K to the control switch IB. The other winding of the motor K is connected directly to the control switch IA through the conductor 4. Both of the motor windings are connected together at their opposite ends and to the supply line 1. One terminal of each of the mercury switches IA and IB are connected together and to the supply line 2 and each of the other terminals of the control switches are connected to a respective winding of the motor K so that closure of one or the other of the switches energizes the motor for rotation in a particular direction. In the arrangement shown in Fig. 10 the switch IA preferably controls the motor K for rotation in the direction to effect a reduction in the speed of the drying rolls.

On failure of one of the triodes M or $m$ or short circuiting of the contact roller G and the guide roller F the armature 6' will be rotated into its furthermost counterclockwise position in the manner described in Fig. 8 for causing counterclockwise rotation of the armature 6. It will be noted that in this new position of the armature 6' that the circuit between the control switch IB and the corresponding winding of the motor K is broken and that three new circuits are closed. The first of these circuits may be traced from the supply conductor 1, one winding of the motor K, conductor 4, and the armature 6' to the supply conductor 2. The motor winding so energized is thus seen to be the one which is normally energized through the control switch IA and, hence, rotation of the motor K occurs in the direction to effect a reduction in the speed of the warp in passing over the drying rolls.

Another of the circuits closed when the armature 6' is in its counterclockwise position may be traced from the supply conductor 1, a solenoid winding $9^2$, and the armature 6' to the supply conductor 2, and results in energization of the solenoid winding $9^2$ and consequent actuation of the steam control valve $d'$ into its closed position. The third circuit which is simultaneously closed may be traced from the supply conductor 1, the signal lamp 9, and the armature 6' to the supply conductor 2, and results in the energization of the signal lamp to thereby provide visual indication of the occurrence of one of the abnormal conditions cited hereinbefore.

It will be noted that actuation of the armature 6' into its counterclockwise position resulted in the opening of the energizing circuit to the motor winding which normally causes rotation of the motor K in the direction to increase the speed of passage of the warp over the drying rolls D. Positive assurance is then had that the resulting energization of the opposing motor winding will cause rotation of the motor K in the direction to effect a reduction in the speed of passage of the warp over the drying rolls.

For purposes of verbal simplification and precision, it is convenient to refer to the two junctions of a Wheatstone bridge, for example the junctions $L^3$ and $L^4$ of Fig. 3, between which a bridge energizing potential difference is maintained, as the energizing junctions of the bridge, and to refer to the other two junctions of the bridge, which have equal, or balancing, potentials when the bridge is balanced, as the balancing junctions of the bridge, and in the appended claims, where words "energizing" and "balancing" are used to identify or designate bridge junctions, those words are used with the special meanings just stated.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. Apparatus for measuring the conductivity of a variable resistance including direct current energizing means and a circuit network which is energized by said means and which comprises circuit portions including two similar electronic triodes forming a Wheatstone bridge having one of said triodes in one of its arms and the other triode in a second arm, a circuit part including said variable resistance and a second resistance in series therewith and connecting network points at different potentials, one of said points being adjustable to vary the potential drop in said circuit part and thereby balance said bridge, a biasing connection between the grid of one triode and the portion of said circuit part intermediate said resistance and a biasing connection between the grid of the other triode and a network point having the same potential as said portion when said bridge is balanced.

2. Apparatus for measuring the conductivity of a variable resistance including direct current energizing means and a circuit network which is energized by said means and which comprises circuit portions including two similar electronic triodes forming a Wheatstone bridge having one of said triodes in one of its arms and the other triode in a second arm, a circuit part including said variable resistance and a second resistance in series therewith and connecting network points at different potentials, one of said points being adjustable to vary the potential drop in said circuit part and thereby balance said bridge, a biasing connection between the grid of one triode and the portion of said circuit part intermediate said resistances and a biasing connection between the grid of the other triode and a network part having the same potential as said portion when said bridge is balanced, and means responsive to unbalance in said bridge for automatically adjusting said adjustable point as required to rebalance the bridge.

3. Apparatus for measuring the conductivity of a variable resistance including direct current energizing means and a circuit network which is energized by said means and which comprises circuit portions including two similar electronic triodes forming a Wheatstone bridge having one of said triodes in one of its arms and the other triode in a second arm, a circuit part including said variable resistance and a second resistance in series therewith and connecting network points at different potentials, one of said points being adjustable to vary the potential drop in said circuit part and thereby balance said bridge, a biasing connection between the grid of one triode and the portion of said circuit part intermediate said resistances and a biasing connection between the grid of the other triode and a network part having the same potential as said portion when said bridge is balanced, and means for automatically adjusting said adjustable point as required to rebalance the bridge, said means comprising a reversible electric motor having two windings, and means responsive to unbalance in said bridge for supplying energizing currents to the windings which are approximately in, or approximately 180° out of, phase with one another, dependent on the direction of bridge unbalance, and thereby operating said motor in one direction or in the opposite direction.

4. Apparatus for measuring the conductivity of a variable resistance including direct current energizing means and a circuit network which is energized by said means, and which comprises circuit portions including two similar electronic triodes forming a Wheatstone bridge, having one of said triodes in one of its arms and the other triode in a second arm, other circuit portions including said variable resistance and other resistances forming a second Wheatstone bridge having said variable resistance in one of its arms and having another of said resistances in each of its other arms, one of said other resistances being adjustable to rebalance said second bridge when the latter is unbalanced by change in said variable resistance, conductors connecting the grids of said triodes to the balancing junctions of said second bridge and means responsive to unbalance in the first mentioned bridge for adjusting said adjustable resistance.

5. In apparatus for measuring the electrical conductivity of a substance, a balanced amplifier unit in the form of a Wheatstone bridge, a second Wheatstone bridge having the said substance included in one arm thereof, connections between the balancing junctions of said second bridge and the input side of said amplifier unit and means disposed in the output circuit of said amplifier unit adapted to restore the potential relations of said balancing junctions to a predetermined value responsively to changes in the conductivity of said substance.

6. In apparatus for measuring the electrical conductivity of a substance, a Wheatstone bridge having similar triodes connected in two arms thereof, a second Wheatstone bridge including said substance in one arm thereof, a source of direct current voltage connected to said bridges, one connection between one balancing junction of said second bridge and the control grid of one of said triodes, and a connection between the second balancing junction of said second bridge and the control grid of the other of said triodes, a current responsive device connected between the balancing junctions of the first mentioned bridge and means under control of said device adapted to restore the potential relations of said balancing junctions to a predetermined value responsively to changes in the conductivity of said substance.

7. In apparatus for measuring the electrical conductivity of a substance, a Wheatstone bridge having similar triodes connected in two adjacent arms thereof, with their cathodes both connected to one of the energizing junctions of the bridge, a second Wheatstone bridge having one of its balancing junctions connected to the first mentioned junction, a third Wheatstone bridge including the electrical resistance of the substance in one arm thereof and having one balancing junction in common with the second balancing junction of said second bridge one of the two balancing junctions of said third bridge being connected to the control grid of one triode, and the other being connected to the control grid of the other triode, a galvanometer connected between the balancing junctions of the first mentioned bridge, and means responsive to deflections of said galvanometer for reducing said galvanometer deflections to zero.

8. In apparatus for measuring the electrical resistance of a body, a Wheatstone bridge having similar triodes included in two arms thereof with their cathodes both connected to one of the energizing junctions of the bridge, a second Wheatstone bridge having one of its balancing junctions connected to the first mentioned junction and having one of its energizing junctions connected to the second energizing junction of the first mentioned bridge, a third Wheatstone bridge including said body in one arm thereof and having one of its balancing junctions connected to the second balancing junction of said second bridge and to the control grid of one of said triodes, and having its other balancing junction connected to the control grid of the other triode, a motor device, and, means controlling the energization of said device in selective accordance with the direction of difference between the voltages of the two balancing junctions of the first mentioned bridge.

9. In apparatus for measuring the electrical resistance of a body, a Wheatstone bridge having similar triodes included in two arms thereof with their cathodes both connected to one of the energizing junctions of the bridge, a second Wheatstone bridge having one of its balancing junctions connected to the first mentioned bridge, a third Wheatstone bridge including said body in one arm thereof and having one of its balancing junctions connected to the second balancing junction of said second bridge, and to the control grid of one of said triodes, and having its other balancing junction connected to the control grid of the other triode, direct current bridge energizing means, a motor device comprising two energizing windings and adapted to operate in one direction or the other accordingly as said windings are energized by alternating current voltages similar, or widely displaced, respectively, in phase, a source of alternating current voltage connected to one of said windings, amplifying means comprising a pair of electronic tubes and having its output side connected to the second of said windings, means through which said source supplies alternating plate voltage to said tubes, a connection between the cathodes of said tubes and one of the energizing junctions of the first mentioned bridge, and connections between the control grid of said tubes and the balancing junctions of the first mentioned bridge.

10. In apparatus for measuring the electrical conductivity of a body, a Wheatstone bridge having a pair of balancing junctions, a source of direct current energizing voltage connected to said bridge, means for producing a difference in voltage between the balancing junctions of said bridge proportional to a variation in the electrical conductivity of said body, and means including a pair of electronic tubes each having a control electrode connected directly to a respective balancing junction of said bridge and an anode and a cathode and selectively set into operation by and in accordance with the direction of said voltage difference to reduce said voltage difference.

11. In apparatus for measuring the moisture content of a moving web, a Wheatstone bridge, a source of direct current bridge energizing voltage connected to said bridge, means for producing a difference in voltage between the balancing junctions of said bridge proportional to a change in moisture content of said moving web including means for varying one bridge arm and means including a pair of electronic tubes selectively set into operation by said voltage difference for reducing the latter, the said last mentioned means including means for varying another bridge arm.

12. In apparatus for measuring the moisture content of a moving web, a Wheatstone bridge, a second Wheatstone bridge, including a portion of said web in one of its arms, a source of direct current bridge energizing voltage connected to said bridges, means through which a difference in the voltages of the balancing junctions of said second bridge produces a difference in the voltages of the balancing junctions of the first mentioned bridge, and means responsive to the last mentioned voltage difference for reducing the first mentioned voltage difference.

13. In apparatus for measuring a variable quantity, the combination of a Wheatstone bridge including means responsive to said quantity in one of its arms, follow-up means for adjusting a second arm of said bridge, a second Wheatstone bridge responsive to unbalance in the potentials of the balancing junctions of the first mentioned bridge and actuating said follow-up means to rebalance said second bridge, when the latter is unbalanced by a change in said quantity.

14. In apparatus for measuring a variable quantity, the combination of a Wheatstone bridge including means responsive to said quantity in one of its arms, follow-up means for adjusting a second arm of said bridge, and a second Wheatstone bridge including a pair of electronic tubes disposed in separate arms through which said bridge is made responsive to unbalance in the potentials of the balancing junctions of the first mentioned bridge, said second bridge actuating said follow-up means to rebalance said second bridge, when the latter is unbalanced by a change in said quantity.

15. In apparatus for measuring a variable quantity, a Wheatstone bridge, a source of electric current supply voltage for said bridge, means for maintaining the voltage drop across one arm of said bridge substantially constant, means included in an oppositely disposed arm adapted upon a change in said quantity to vary in electrical resistance, and means responsive to such variations adapted to vary the electric current flow through said last mentioned arm for restoring the voltage drop thereacross to a predetermined value.

16. In apparatus for measuring a variable quantity, a Wheatstone bridge, a source of electric current for supplying bridge energizing voltage, means included in one arm of said bridge adapted upon a change in said quantity to vary in electrical resistance and to thereby vary the voltage drop across said arm, means adapted to vary the bridge energizing voltage in accordance with changes in the voltage drop across said arm, and means for maintaining the voltage drop across an oppositely disposed arm substantially constant.

17. In a bridge circuit having four arms, opposite arms thereof connected together and to a source of voltage and adjacent arms thereof connected together and to means responsive to bridge unbalance, a variable resistance in one arm thereof, the resistance of which is to be measured and which on a change in resistance will unbalance said bridge, means for varying the relative resistances of said bridge arms to rebalance said bridge on unbalance thereof, and means varying the said source of voltage simultaneously with said balancing action.

18. In a bridge circuit having four arms, opposite arms thereof connected together and to a source of voltage and adjacent arms thereof connected together and to means responsive to bridge unbalance, the means responsive to bridge unbalance comprising electronic means including a grid connected to one junction of adjacent bridge arms, and a grid connected to the other junction of adjacent bridge arms, a variable resistance in one arm thereof, the resistance of which is to be measured and which on a change in resistance will unbalance said bridge, means for varying the relative resistances of said bridge arms to rebalance said bridge on unbalance thereof, and means for varying the said source of voltage simultaneously with said balancing action.

19. In apparatus for determining the moisture content of a substance, means impressing a voltage on said substance, a circuit network including a device responsive to an electrical characteristic change in said circuit resulting from a change in moisture content of said substance, means controlled by said responsive device to produce an effect compensating for said characteristic change, and means varying said voltage as said characteristic changes.

20. In apparatus for measuring the moisture content of a substance, means impressing a voltage on said substance, a device measuring the current flow through said substance, means controlled by said device to produce an effect compensating for variations in said current flow through said substance and means adapted to decrease said voltage, as said current increases, in such manner as to maintain said voltage below the breakdown voltage of said substance over a substantial range.

21. In measuring apparatus, a variable resistance to be measured, means impressing a voltage across said resistance, a device responsive to variations in the current through said resistance resulting from variations in said resistance, means controlled by said responsive device to produce an effect compensating for said variations in the current through said resistance, and means for decreasing said voltage as said current increases.

22. In combination, two similar triodes and two inductive windings connected to form a Wheatstone bridge with the two triodes respectively included in the two arms of the bridge connected to one of its energizing junctions and with the two windings respectively included in the other two arms of the bridge, direct current bridge energizing means, and means operatively associated with said bridge and including a safety element inductively related to said windings to respond to a change in the relative inductive effects of the two windings.

23. In combination, two similar triodes and two inductive windings connected to form a Wheatstone bridge with the two triodes respectively included in the two arms of the bridge connected to one of its energizing junctions and with the two windings respectively included in the other two arms of the bridge, direct current bridge energizing means, and means operatively associated with said bridge and including a safety element inductively related to said windings to respond to an interruption in the current flow through either.

24. In combination two similar triodes and two inductive windings connected to form a Wheatstone bridge with the two triodes respectively included in the two arms of the bridge connected to one of its energizing junctions and with the two windings respectively included in the other two arms of the bridge, direct current bridge energizing means, and means operatively associated with said bridge and including a safety element inductively related with said windings to respond both to an abnormal decrease in the inductive effect of one of the windings, and to an abnormal increase in the inductive effect of the other winding.

WALTER P. WILLS.